Jan. 24, 1950     E. L. DUCHESNE     2,495,240
STEM LOCK FOR DIAL GAUGES
Filed June 18, 1946
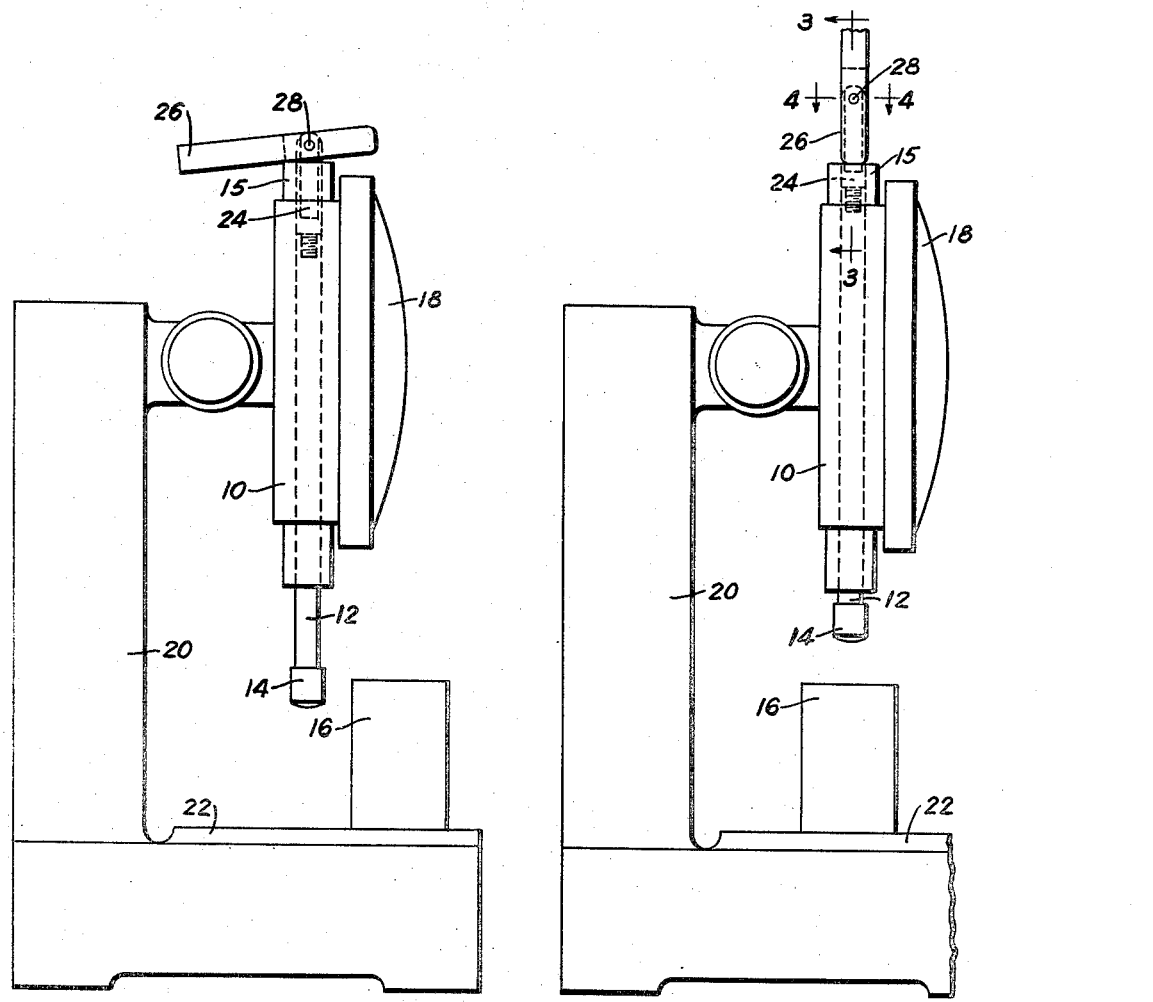
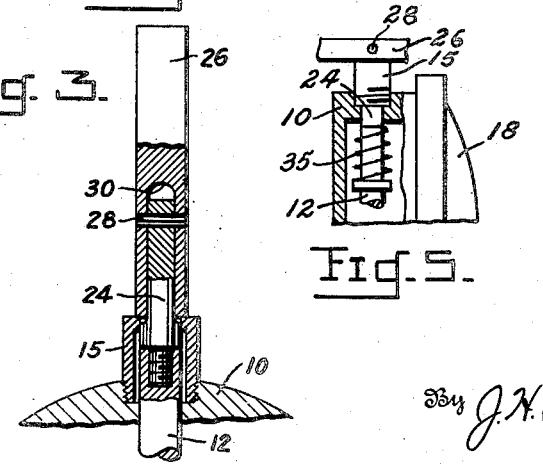
Inventor
EARL L. DUCHESNE.

Patented Jan. 24, 1950

2,495,240

UNITED STATES PATENT OFFICE 2,495,240

STEM LOCK FOR DIAL GAUGES

Earl L. Duchesne, Philadelphia, Pa.

Application June 18, 1946, Serial No. 677,471

4 Claims. (Cl. 33—172)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to dial indicator and other gages of the retractable stem type and it has special reference to selectively effective means for holding the stems of such gages fully retracted.

Broadly stated, the object of my invention is to improve the operating effectiveness of dial indicator and other retractable stem gages.

A more specific object is to safeguard the stems of such gages during set up of the work to be measured.

Another object is to provide means by which the stems of such gages may be locked in their fully retracted position with a single manipulation of the locking lever.

A further object is to provide such locking means which are operative with gages whose stems have either short or long ranges of travel.

A still further object is to provide a gage stem lock of improved design and enhanced usefulness.

In practicing my invention I attain the foregoing and other objects and advantages, by providing a gage stem lock that has the unique construction and the superior performance presently to be described. One preferred form of my improved device is shown by the accompanying drawings wherein:

Fig. 1 is a side view of a conventional dial indicator gage showing my new lock installed on the stem thereof and depicting same released to allow the full stem protrusion represented;

Fig. 2 is a similar showing of the new lock when functioning to hold the gage stem fully retracted;

Fig. 3 is an enlarged section on line 3—3 of Fig. 2 showing certain constructional details of the lock;

Fig. 4 is an enlarged section on line 4—4 of Fig. 2 showing further details of the lock parts;

Fig. 5 is a view showing a portion of the gage case whose wall has been removed to expose the gaging stem and spring therefor.

Gages with which lock is usable

Retractable stem gages of a wide variety of types may be benefited by my improved locking device. The dial indicator gage of Figs. 1–2 is illustrative of these. It comprises a case body 10 having a stem 12 longitudinally movable therethrough. The "gaging" or lower end of this stem is normally protruded by spring action (see Fig. 5), as shown by Fig. 1, while the upper or "follower" end is correspondingly retracted.

Affixed to the stem gaging end is a tip 14 for contacting the surface of work 16 to be measured. Indication of the thickness or other characteristic of such work is given by the usual pointer (not shown) that is rotated by movement of the stem 12 through case 10, and that registers with a graduated scale (likewise not shown) also within the case. A transparent case cover 18 allows both this scale and the pointer to be viewed by the gage operator.

Supporting this illustrative gage of Figs. 1–2 is a pedestal or other conventional mount 20 upon the base 22 of which the work 16 to be measured is shown as resting. As the description proceeds it will become apparent that this arrangement is representative of a number of other extensively used gage set-ups wherein full protrusion of stem 12, as indicated by Fig. 1, prevents insertion of the work 16 until the stem has been retracted away from base 22 as shown by Fig. 2.

Stem 12 is urged downwardly by an internal spring 35 (see Fig. 5); hence, unless the named separation is first effected, insertion of work 16 between the gage and the reference platform 22 will mechanically push stem tip 14 to one side, typically bending or even breaking the stem and thereby both damaging and impairing operativeness of the complete gage.

Past practice in effecting the required separation has principally been to utilize toggle clamps (not shown) in a way to retract the entire indicator 10, along with the stem, away from the gaging position. Such an arrangement involves mechanical complications and inconveniences that make it far less desirable than the represented stationary mounting of gage body 10 which use of my improved stem lock makes possible.

The prior art stem lock which I have improved

One important advance over the just described "past practice" is shown and described by Patent Number 2,415,105 in the name of John Longworth for "Stem lock for dial gages."

Longworth's stem lock replaces the dust cap (represented as 15 in Figs. 1–2 of my application) and a restraining screw thereunder which prevents the stem from dropping out of the gage case. The dust cap conventionally screws into the top of the gage case, while the restraining screw is screwed into the follower end of the gage stem. Only three parts comprised Longworth's lock; an analogous group of three parts comprise my present improvement thereover. In each case they include: (a) a support stud 24; (b) a body or latch 26; and (c) a pin 28 which hingedly attaches the latch to the stud.

In Longworth's construction, the support stud is screwed into a hole conventionally tapped into the gage stem's top to receive the aforementioned stem restraining screw. A hole is drilled transversely through the uppermost end of the stud, and a matching hole is drilled transversely through the lower end of a latch whose construction is such that it has a C-shaped cross section. This latch is fitted to the stud so that the just mentioned transverse holes are in line with each other then pin 28 is inserted therethrough to form the abovementioned hinged connection.

With this just described Longworth device, the latch is in a released position when its long axis is perpendicular to that of the stem (similar to the unlocked position of the latch in the accompanying illustrations hereof). Under this lock-released condition, the stem is free to operate as intended throughout its complete range of travel in the same way as if no stem lock had been installed on the gage.

To lock the stem in the retracted position with this Longworth device it is necessary manually to pull the gage stem upwardly, and then swing the latch inwardly so that the latch's lower end abuts the top of the gage case and thereby restrains the stem against downward movement under spring action. As Longworth points out in his specification, the latch's length is chosen so that in the locking position it holds the stem retracted as fully as required.

My improved stem lock

The differences between Longworth's prior art device and my now disclosed superior mechanism reside in the respective constructions and combinations in each apparatus of the three stem lock parts earlier named.

As the accompanying illustrations show, the dust cap 15 supplied with conventional dial gages need not be removed in utilizing my improvement. Instead, a hole is drilled axially therethrough in line with the tapped hole in gage stem 12 which conventionally receives a stem restraining screw (not shown), and a supporting stud 24 is screwed thereinto as shown in Figs. 1-2-3. A latch 26 is then hingedly attached to the upper extremity of stem 12 as depicted in Figs. 1-2-3-4. This latch 26 is not of C-shaped cross section like that employed by Longworth; instead its section is substantially rectangular and one end has a slot 30 cut through two opposing sides so that the latch may hingedly swing to enclose the portion of stud 24 which protrudes from stem 12 as shown in section by Figs. 3-4 and in dotted outline by Figs. 1-2.

A hole is drilled transversely through the opposing sides of latch 26 just referred to, and another hole to match is drilled transversely through the upper end of stud 24. Then the upper end of stud 24 is fitted into latch 26's slot 30 so that the two holes are aligned with each other, and pin 28 is inserted therethrough as shown in the drawings to make the aforementioned hinged connection.

The position of this hinge with respect to its connection to the latch may be as shown or else closer to one or the other end of the latch. The length of slot 30 which accommodates the upper end of stud 24 may also be made correspondingly longer or shorter as required. The exact position of the hinge is determinable by the distance through which it is necessary to raise up the stem 12.

Reference to Fig. 3 will make this point clear: if pin 28 there shown were to be installed a certain distance closer to the top of dust cap 15, the effect would be to raise stem 12 a correspondingly lesser amount than would result with the depicted construction when latch 26 is placed in the illustrated locking position. Conversely, installation of hinge pin 28 in latch 26 higher up with respect to dust cap 15 will cause the stem to be raised that much more when the latch is in the locking position of Fig. 3.

This adjustability of hinge installation (closer or farther away from the lower end of latch 26) enables my device to be used for locking gage stems having short ranges of travel as well as with those having long travel ranges. This factor is a decided advantage over the Longworth apparatus which is best operative with indicators whose stems have relatively long ranges of travel.

The unique and advantageous mode of operation of my improved stem lock will now have become fully evident. Fig 1 represents the released or unlocked position; Figs. 2-3 the locked position. The change from the Fig. 1 to the Figs. 2-3 positions require no prior pulling of stem 12 upwardly before swinging the latch into its locking relationship (as with Longworth's device). Instead, with a single manipulation the "handle" end of latch 26 (i. e. the end away from slot 30) is pushed upwardly so that the latch's lower end abuts the top of dust cap 15 and thereby restrains the gage stem against downward movement under spring action. When so pushed upwardly the latch 26 acts as a lever of the second class, the dust cap 15 (or the top of the case if the dust cap is removed) acts as the fulcrum, and the gage stem plus stud 24 act as the weight which is lifted by the lever. Under this lock-engaged condition the stem tip 14 is positively held out of reach by the work 16 and the work may therefore be slid into gaging position without contacting or damaging the gage stem.

Release of the lock is effected at will merely by turning the latch 26 down from its vertical Fig. 2 to the horizontal Fig. 1 position, and permitting the gage parts to assume their original "unlocked condition" as represented in Fig. 1.

As will be obvious to those skilled in gage construction, all parts of my locking device may satisfactorily be made of brass, steel or other suitable material. The design details thereof may also be varied as required without departing from the spirit and intent of my invention. For example, the dust cap may be removed instead of boring a hole therethrough, and the stud 24 screwed directly into stem 12 as described. If desired, too, the lever-like latch 26 may also be made to swing from the front side of the dial gage rather than from the rear side as shown. From these examples it should be clear that still other modifications also may be made to suit individual requirements.

Summary

From the foregoing it will be seen that I have provided selectively efficient means for holding the stems of dial indicator and other gages fully retracted; that I have safeguarded the stems of such gages from damage during set up of the work to be measured; that I have provided means by which the stems may be locked in their fully retracted position with a single manipulation of the locking lever; that I have provided locking means which are operative with gages whose stems have either short or long ranges of travel; and that I have provided a gage stem lock of improved design and enhanced usefulness.

My invention is therefore broad in its adaption and hence is not to be restricted to the specific form here shown by way of illustration.

I claim:

1. In combination, a dial indicator gage comprising a case, a stem extending through said case for longitudinal movement with respect thereto and having gaging and follower ends that protrude from opposite case sides, resilient means urging said stem in a direction to protrude its gaging end from the case to a maximum and withdraw its said follower end toward the case, and a second class lever forming a stem lock latch hingedly attached intermediate its fulcrum and power-application points to the gage stem's said follower end for selective swinging thereabout from an "unlock" position away from the stem body where the aforesaid stem movement is in no way interfered with to a "lock" position paralleling the stem body where one end of said lever abuts said gage case beside the stem and thereby holds the stem against said resilient means with the gaging end thereof withdrawn toward the case and the follower end thereof correspondingly protruded from the case.

2. In combination, a dial indicator gage comprising a case, a stem extending through said case for longitudinal movement with respect thereto and having a gaging end which protrudes from one side of said case plus a follower end that axially aligns with an opening in the opposite case side, resilient means urging said stem in a direction to protrude its said gaging end from the case to a maximum and withdraw its said follower end into the case, a lock stud threadedly secured to the gage stem's said follower end and protruding axially from that end through said opening to the case exterior, and a second class lever forming a latch hingedly attached intermediate its fulcrum and power-application points to said stud for selective swinging thereabout from an "unlock" position away from the stem body where the aforesaid movement is in no way interfered with to a "lock" position paralleling the stem body where one end of said lever abuts said gage case beside the stem and thereby holds the stem against said resilient means with the gaging end thereof withdrawn toward the case and the follower end lock stud correspondingly protruded from the case.

3. For use with an indicator type gage made up of a case, a longitudinally movable stem extending through said case and having a gaging end which protrudes from one side of said case plus a follower end which axially aligns with an opening in the opposite case side, a dust cap covering said opening and removably attached to said case, and resilient means urging the stem in a direction to effect a maximum protrusion of the stem's gaging end from the case and withdrawal of the stem's follower end away from said dust cap, the combination of a lock stud extending through a hole in said dust cap and threadedly attached to the gage stem's said follower end, a gage stem locking device comprising a latch hingedly attached intermediate its two ends to said stud for selective swinging from an "unlock" position away from the stem to a "lock" position paralleling said stem and in which position one end of said latch abuts said dust cap beside the stem and thereby holds the stem against said resilient means with the gaging end thereof withdrawn toward the case and the follower end thereof correspondingly protruded from the case into said dust cap.

4. In combination, a dial indicator gage comprising a case, a stem extending through said case for longitudinal movement with respect thereto and having gaging and follower ends that protrude from opposite case sides, resilient means urging said stem in a direction to protrude its gaging end from the case to a maximum and withdraw its said follower end toward the case, and a second class lever forming a stem lock latch hingedly attached between its fulcrum and power-application points to the gage stem's said follower end for selective swinging thereabout from an "unlock" position away from the stem body where the aforesaid stem movement is in no way interfered with to a "lock" position paralleling the stem body where the lever's said hinge attached end abuts said gage case beside the stem and thereby holds the stem against said resilient means with the gaging end thereof withdrawn toward the case and the follower end thereof correspondingly protruded from the case.

EARL L. DUCHESNE.

REFERENCES CITED

The following references are of record in the file of this patent:

UNITED STATES PATENTS

| Number | Name | Date |
| --- | --- | --- |
| 357,116 | Coultaus | Feb. 1, 1887 |
| 2,415,105 | Longworth | Feb. 4, 1947 |